(12) United States Patent
Lydecker et al.

(10) Patent No.: US 12,491,344 B2
(45) Date of Patent: Dec. 9, 2025

(54) MEDICAL SYSTEMS, DEVICES, AND RELATED METHODS

(71) Applicant: Boston Scientific Scimed, Inc., Maple Grove, MN (US)

(72) Inventors: Lauren Lydecker, Millbury, MA (US); Andrew Pic, Northboro, MA (US); Martin Burke, Galway (IE); Juan Pablo Ortiz Garcia, Heredia (CR); Travis Henchie, Worcester, MA (US); John Favreau, Spencer, MA (US); Jessica Powers, Boston, MA (US)

(73) Assignee: Boston Scientific Scimed, Inc., Maple Grove, MN (US)

(*) Notice: Subject to any disclaimer, the term of this patent is extended or adjusted under 35 U.S.C. 154(b) by 180 days.

(21) Appl. No.: 17/179,489

(22) Filed: Feb. 19, 2021

(65) Prior Publication Data
US 2021/0268241 A1 Sep. 2, 2021

Related U.S. Application Data

(60) Provisional application No. 62/982,328, filed on Feb. 27, 2020.

(51) Int. Cl.
*A61M 25/09* (2006.01)
*A61M 1/00* (2006.01)
*A61M 25/00* (2006.01)

(52) U.S. Cl.
CPC ............ *A61M 25/09* (2013.01); *A61M 1/604* (2021.05); *A61M 1/85* (2021.05);
(Continued)

(58) Field of Classification Search
CPC ............ A61M 1/85; A61M 2025/0057; A61M 2025/091; A61M 2202/0007; A61M 1/90;
(Continued)

(56) References Cited

U.S. PATENT DOCUMENTS 6,398,758 B1 * 6/2002 Jacobsen et al. . A61M 25/0082
10,058,413 B2 8/2018 Heiss
(Continued)

FOREIGN PATENT DOCUMENTS

| CN | 108136157 A | 6/2018 |
|---|---|---|
| JP | 2003521962 A | 7/2003 |

(Continued)

OTHER PUBLICATIONS

Rago AP, et al., "Conceptualized Use of Self-Expanding Foam to Rescue Special Operators From Abdominal Exsanguination: Percutaneous Damage Control for the Forward Deployed," J Spec. Oper. Med., 2015 Fall, 15(3):39-45, PubMed PMID: 26360352 (7 pages).
(Continued)

*Primary Examiner* — Loan B Jimenez
*Assistant Examiner* — Kathleen Paige Farrell
(74) *Attorney, Agent, or Firm* — Bookoff McAndrews, PLLC (57) ABSTRACT

A medical system includes a source of a material, a first tube, and a second tube. The material is configured to expand and form a porous body after the material is deployed into a body lumen. The first tube is configured to deliver the material into the body lumen, and the second tube is configured to apply suction to the porous body.

19 Claims, 7 Drawing Sheets

(52) U.S. Cl.
CPC . *A61M 25/0045* (2013.01); *A61M 2025/0057* (2013.01); *A61M 2025/0079* (2013.01); *A61M 2025/09075* (2013.01); *A61M 2025/091* (2013.01); *A61M 2025/09141* (2013.01); *A61M 2202/0007* (2013.01)

(58) Field of Classification Search
CPC ...... A61M 3/005; A61M 1/916; A61M 27/00; A61M 25/04; A61M 31/00; A61M 1/604; A61M 1/60; A61M 1/64; A61M 1/74; A61M 1/84; A61M 1/962; A61M 3/0283; A61M 2025/09183; A61M 25/0026; A61M 1/92; A61F 13/00068; A61F 2013/00357; A61F 2013/00536; A61F 2013/0054; A61F 2013/00927; A61F 2/945; A61F 2250/0003; A61F 13/00063; A61F 13/00021; A61F 2/04; A61F 2013/00174; A61F 13/05; A61B 17/0057; A61B 1/00087; A61B 17/00234; A61B 2017/00358; A61B 2017/00349; A61B 2017/00575; A61B 2017/320064; A61B 2218/003; A61B 2017/00898; A61B 17/1219; A61B 17/12186; A61B 2017/00287; A61B 2017/0225; A61B 2017/00659; A61B 2017/00632; A61B 2017/00849; A61B 2017/345; A61B 2217/005; A61B 1/00094; A61B 1/0058; A61B 1/008; A61B 17/221; A61B 1/0085; A61B 17/3205; A61B 17/32056; A61B 1/018; A61B 17/0218; A61B 17/1285; A61B 18/492; A61B 2017/00292; A61B 2017/00296; A61B 2017/0034; A61B 17/00353; A61B 1/00085; A61B 17/22031; A61B 17/22; A61B 90/00; A61P 17/02; A61L 15/425; A61L 26/0085; A61L 27/56; A61L 31/145; A61L 31/146
See application file for complete search history.

(56) References Cited

U.S. PATENT DOCUMENTS

| | | | |
|---|---|---|---|
| 10,779,928 B2 | 9/2020 | Heiss | |
| 2002/0042617 A1* | 4/2002 | Ouchi | A61B 17/22 606/127 |
| 2004/0006319 A1* | 1/2004 | Lina et al. | A61M 1/962 |
| 2004/0087998 A1* | 5/2004 | Lee et al. | A61B 17/12172 |
| 2008/0033467 A1* | 2/2008 | Miyamoto et al. | A61B 17/221 |
| 2009/0270907 A1* | 10/2009 | Todd et al. | A61B 17/22031 |
| 2011/0104280 A1* | 5/2011 | Hnojewyj | A61B 17/0057 |
| 2013/0023840 A1* | 1/2013 | Loske et al. | A61B 90/39 |
| 2014/0031773 A1* | 1/2014 | Mikkaichi | A61M 1/916 |
| 2014/0257375 A1* | 9/2014 | Tegels | A61B 17/0057 |
| 2015/0335493 A1* | 11/2015 | Hicks et al. | A61M 1/915 |
| 2016/0022253 A1* | 1/2016 | Khanchandani | A61B 17/00491 606/214 |
| 2016/0296665 A1* | 10/2016 | Ingber et al. | B05D 3/104 |
| 2016/0310124 A1* | 10/2016 | Piskun | A61B 1/00135 |
| 2017/0290708 A1* | 10/2017 | Rapp | A61F 13/05 |
| 2018/0214316 A1 | 8/2018 | Robinson et al. | |
| 2019/0275194 A1* | 9/2019 | Studdert | A61L 15/60 |
| 2020/0009303 A1 | 1/2020 | Kleiner | |
| 2020/0276056 A1 | 9/2020 | Leeds | |

FOREIGN PATENT DOCUMENTS

| | | | |
|---|---|---|---|
| RU | 2648026 | 3/2018 | |
| WO | 2010080667 A1 | 7/2010 | |
| WO | WO 2013/096605 A1 | 6/2013 | |
| WO | WO2019040656 A1 * | 2/2019 | A61F 13/00 |
| WO | WO 2019/059893 A1 | 3/2019 | |

OTHER PUBLICATIONS

Chang et al., "ResQFoam for the Treatment of Non-Compressible Hemorrhage on the Front Line," Sep. 2015, p. 932-933, vol. 180, Military Medicine (2 pages).

International Search Report and Written Opinion issued in International Application No. PCT/US2021/018650, issued May 27, 2021 (14 pages).

Loske G et al: "Tips and tricks for endoscopic negative pressure therapy", Der Chirurg: Zeitschrift Fuer Alle Gebiete Der Operativen Medizin, Springer Verlag, Berlin, DE, vol. 90, No. 1, Oct. 2, 2018 (8 pages).

Official Communication in European Application No. 21712285.2, dated Mar. 21, 2024 (4 pages).

Office Action in Japanese Application No. 2022-551258, dated Dec. 10, 2024 (4 pages).

* cited by examiner

MEDICAL SYSTEMS, DEVICES, AND RELATED METHODS

CROSS-REFERENCE TO RELATED APPLICATIONS

This patent application claims the benefit under 35 U.S.C. § 119 to U.S. Provisional Patent Application No. 62/982,328, filed on Feb. 27, 2020, the entirety of which is incorporated herein by reference.

TECHNICAL FIELD

Various aspects of this disclosure generally relate to medical systems, devices, and related methods that may be used to treat a subject. For example, aspects of the disclosure relate to medical systems, devices, and methods for endoscopic medical procedures, such as closing a wound or otherwise treating tissue.

BACKGROUND

Endoscopic and open surgical procedures of the gastrointestinal (GI) tract include, for example, colonic resection, bariatric surgery, esophagectomy, gastric bypass, and sleeve gastrectomy, among others. These procedures may result in perforation, post-surgical leaks, or other wounds of the tract. Limited treatment options exist for managing such wounds, which have significant morbidity and mortality rates. Options include surgical re-operation and endoscopic placement of a stent or clips. Surgery is relatively invasive and also has high morbidity and mortality rates. Endoscopic stent placement is a less invasive option. The placed stent, however, can migrate from the intended location and/or wall off infection at the treatment site, inhibiting drainage.

The systems, devices, and methods of the current disclosure may rectify some of the deficiencies described above or address other aspects of the art.

SUMMARY

Examples of this disclosure relate to, among other things, systems, devices, and methods for performing one or more medical procedures with the medical systems and devices. Each of the examples disclosed herein may include one or more of the features described in connection with any of the other disclosed examples.

In one example, a medical system may include a source of a material, a first tube, and a second tube. The material may be configured to expand and form a porous body after the material is deployed into a body lumen. The first tube may be configured to deliver the material into the body lumen, and the second tube may be configured to apply suction to the porous body.

The medical system may include one or more of the following features. The first tube may be coupled to the source of the material, and may be configured to spray the material into the body lumen. The material may include a liquid phase polyurethane foam that expands and/or solidifies when in contact with moisture or air. The material may include an open cell foam. The first tube may include at least two lumens, and the material may include two liquids, delivered through the first tube through different lumens of the two lumens, that solidify and form the porous body when the liquids come into contact with one another. The material may expand to take the shape of a pocket into which the material is delivered. The porous body may be at least partially biodegradable.

The medical system may further include a removal device having a plurality of arms that are expandable to form a cage. The arms may be self-expandable and may be formed of a shape memory alloy. At least one of the arms may include a bend such that the at least one arm expands radially outward and a distal portion of the at least one arm bends radially inward. The cage may be movable within a lumen of an insertion device, and proximal movement of the cage within the lumen of the insertion device may at least partially collapse the cage. The porous body may be removed from the body lumen via the cage and the insertion device. The removal device and the second tube may be movable within respective lumens in a catheter. The removal device and the second tube may be positionable such that the porous body surrounds at least distal portions of the cage and the second tube.

The medical system may further include a rod movable within the second tube. The rod may form a seal preventing the material from entering a distal end of the second tube.

In another example, a medical device may include a porous body including a plurality of layers having a biodegradable material. An outermost layer of the plurality of layers may be configured to degrade, within body tissue, more quickly than an interior layer of the plurality of layers. Different layers of the porous body may be formed of different materials, different densities of a same material, or different blends of same materials.

The medical device may include one or more of the following features. The outermost layer may be configured to degrade in 12 to 36 hours after insertion of the porous body into body tissue, and the interior layer may be configured to degrade in 36 to 60 hours after insertion of the porous body into body tissue. The medical device may further include an inner core with openings and suction port connected to the inner core. The inner core and the suction port may be configured to apply negative pressure to the porous body.

In yet another example, a medical system may include a porous bag, a treatment material, and a tube coupled to the porous bag. The treatment material may be configured to be delivered to and retained within the porous bag. Delivery of the treatment material to the porous bag may be configured to expand the bag from a compressed configuration to an expanded configuration. The tube may be configured to deliver the treatment material to the porous bag and apply negative pressure to the porous bag.

The medical system may include one or more of the following features. The medical system may further include a catheter with a lumen. At least a portion of the porous bag may be configured to be positioned with the lumen during delivery of the porous bag to a treatment site. The treatment material may be a granular or porous material, and may help to form a semi-rigid surface that may collapse when negative pressure is applied. The medical system may help to allow for a change in size and/or shape of the porous bag at a treatment site.

In another example, a medical system may include a delivery tube and a medical device. The delivery tube may be configured to deliver a material that expands and forms a sponge in the body lumen. The medical device may be configured to support and/or remove at least a portion of the sponge.

It may be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

The terms "proximal" and "distal" are used herein to refer to the relative positions of the components of an exemplary medical system and exemplary medical devices. When used herein, "proximal" refers to a position relatively closer to the exterior of the body or closer to a medical professional using the medical system or medical device. In contrast, "distal" refers to a position relatively further away from the medical professional using the medical system or medical device, or closer to the interior of the body. As used herein, the terms "comprises," "comprising," "having," "including," or other variations thereof, are intended to cover a non-exclusive inclusion, such that a system, device, or method that comprises a list of elements does not include only those elements, but may include other elements not expressly listed or inherent thereto. Unless stated otherwise, the term "exemplary" is used in the sense of "example" rather than "ideal." As used herein, the terms "about," "substantially," and "approximately," indicate a range of values within +/−10% of a stated value.

Embodiments of this disclosure include devices, systems, and methods for endoluminal vacuum therapy (EVAC). In examples, EVAC includes endoluminal placement of a porous body, for example, a sponge, or other like material into the wound site, including a perforation, cyst, a leak, an anastomosis, etc. Placement of the material may be via a catheter, scope (endoscope, bronchoscope, colonoscope, etc.), tube, or sheath inserted into the GI tract via a natural orifice. The orifice can be, for example, the nose, mouth, or anus, and the placement can be in any portion of the GI tract, including the esophagus, stomach, duodenum, large intestine, or small intestine. Placement also can be in other organs reachable via the GI tract.

Endoluminal vacuum therapy (EVAC) has been proposed. In EVAC, negative pressure is delivered to the wound site in the GI tract, for example through a nasogastric tube having a sponge at its terminal end. The sponge is placed endoscopically into the perforation, leak, or other wound. Negative pressure then is applied. Devices and systems suited for EVAC are limited, however.

Reference will now be made in detail to examples of the present disclosure described above and illustrated in the accompanying drawings. Wherever possible, the same reference numbers will be used throughout the drawings to refer to the same or like parts.

Figure 1:
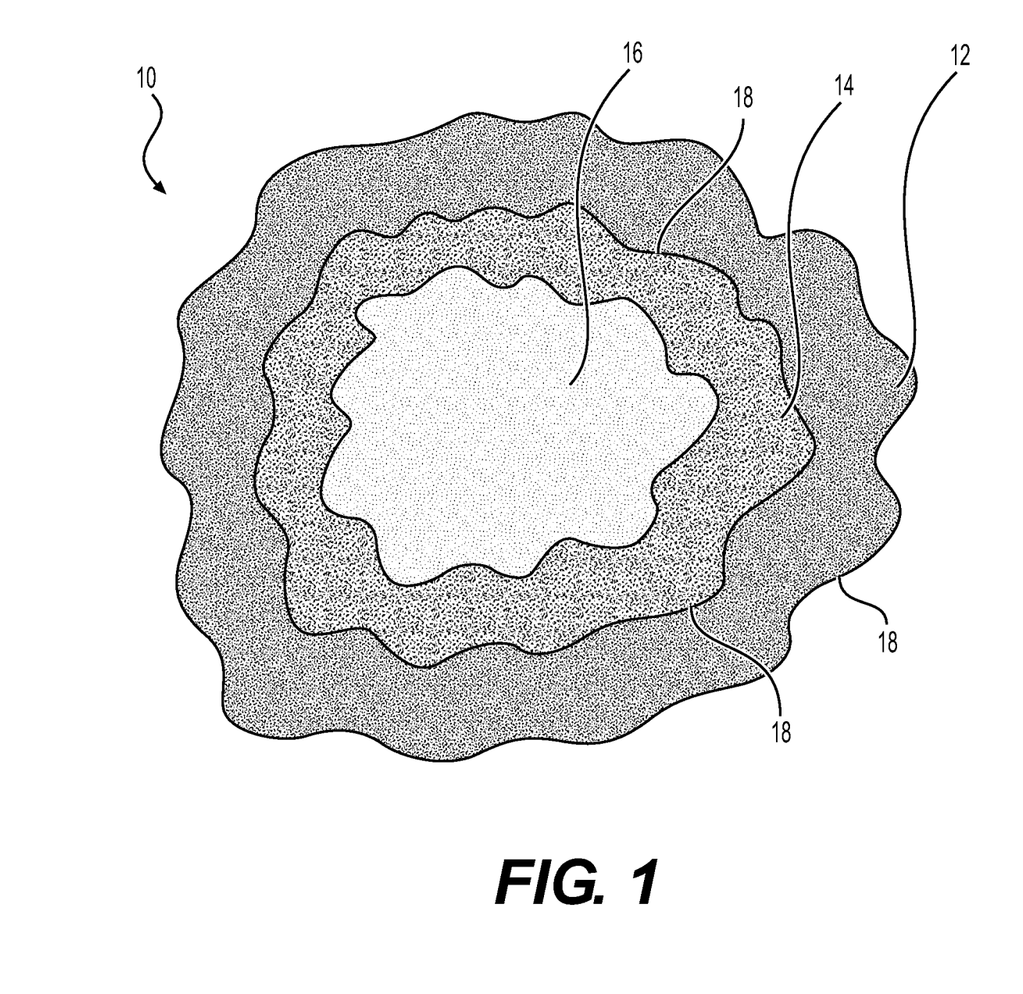
FIG. 1 illustrates a cross-sectional view of an exemplary medical device, according to aspects of this disclosure.

FIG. 1 illustrates a cross-sectional view of an exemplary medical device, for example, a porous and absorbent body, or a sponge 10, that may be used to help the healing of an internal wound or anastomosis in a subject, or otherwise help treat tissue. Sponge 10 includes a plurality of layers, for example, an outer layer 12, an intermediate layer 14, and an inner layer 16. As discussed below, one or more of layers 12, 14, 16 may be biocompatible and/or have varying degrees of degradation (i.e., the various layers may degrade at different rates). For example, as shown in FIGS. 2A-2D, outer layer 12 may degrade in a subject 30 faster than intermediate layer 14, and intermediate layer 14 may degrade in subject 30 faster than inner layer 16. In one aspect, inner layer 16 may not degrade (i.e., may be biostable) and may be removed by a physician. Moreover, although three layers 12, 14, 16 are shown in FIG. 1, this disclosure is not so limited. Sponge 10 may include any number of layers, and the thicknesses of the layers may vary based on the desired size and/or shape of sponge 10, a desired degradation time of sponge 10 as a whole, a desired degradation time of each layer, etc.

Additionally, sponge 10 may include one or more antibacterial or antimicrobial layers 18, for example, on outer layer 12, between outer layer 12 and intermediate layer 14, and/or between intermediate layer 14 and inner layer 16. The one or more antimicrobial layers 18 may help to limit and/or reduce bacterial growth while the wound heals. Alternatively or additionally, one or more layers of sponge 10 may include an antibacterial or antimicrobial material (e.g., a gel) that may be delivered to the wound, for example, the antibacterial or antimicrobial material may secrete or weep from the one or more layers of sponge 10. For example, the antibacterial or antimicrobial material may be embedded throughout the one or more layers, or located in, for example, a bolus in one or more layers.

Furthermore, in embodiments of this disclosure, sponge 10 may be formed of any suitable biocompatible material that may absorb liquids and/or permit liquid to pass therethrough via application of suction/negative pressure to sponge 10. The material may be flexible, compressible, porous, hydrophilic, sterile, and/or disposable. The sponge material may be (or formed by) an open-cell foam. Suitable materials include collagens, polyurethanes, esters, ethers, composite materials, polyethylene glycols, polyethylene oxides, polysaccharides, silver-based materials, and/or any medical-grade material. In some aspects, sponge 10 may include a biomaterial (e.g., materials that are biocompatible and/or derived from biological materials), which may be at least partially or completely bioresorbable, such as chitosan (e.g., chitosan acetate and/or chitosan lactate), extracellular matrix, or a combination thereof.

Additionally, in some aspects, layers 12, 14, 16 of sponge 10 may be formed of different materials, different material densities, different blends of materials, etc. in order to control the rates of degradation of layers 12, 14, 16. For example, layer 12 may be formed of a first material, layer 16 may be formed of a second material, and layer 14 may be formed of a blend of the first material and the second material. Alternatively, layers 12, 14, 16 may be formed of the first material and the second material, with the blends or ratios of the first material to the second material varying between each layer.

Moreover, the respective thicknesses of each of layers 12, 14, 16 may vary and/or depend on, for example, the size and/or shape of sponge 10, the size of the wound, the material(s) of sponge 10, the desired degradation of sponge 10, etc. In one example, outer layer 12 may fully or at least substantially fully degrade after approximately 12 to 36 hours (a first time period), for example, 24 hours, from the placement of sponge 10, and intermediate layer 14 may fully or at least substantially fully degrade after approximately 36 to 60 hours (a second time period greater than the first time period), for example, 48 hours, from the placement of sponge 10. Furthermore, in this example, inner layer 16 may fully or at least substantially fully degrade after approximately 60 to 84 hours (a third time period greater than the second time period), for example, 72 hours, from the placement of sponge 10. In these aspects, sponge 10 may include as many layers as expected for the recovery and/or the healing of the wound. For example, if the wound is expected to take five days to heal, sponge 10 may include five layers, with each layer degrading over the course of approximately one day after the placement of sponge 10 or after the degradation of the preceding outermost layer. In some aspects, an innermost layer may not degrade in the expected treatment period and may be removed by a physician. For example, the innermost layer may be biodegradable, but may degrade at a rate at which the innermost layer has not yet degraded by the time the physician removes sponge 10.

FIGS. 2A-2D illustrate views of an internal body lumen, for example, an esophagus 32, of subject 30 during various stages of recovery from a procedure (e.g., bariatric surgery). For example, FIGS. 2A-2D illustrate views of esophagus 32 with sponge 10 in various stages of recovery from the procedure that included the formation of a wound in a pocket 34. Although FIGS. 2A-2D illustrate sponge 10 being used to treat wound in pocket 34 in esophagus 32, this disclosure is not so limited. Sponge 10 and the procedures discussed herein may be used to treat wounds, leaks, perforations, etc. in a subject's upper gastrointestinal tract, a subject's lower gastrointestinal tract, other lumens or cavities within a subject, on an exterior of a subject, etc.

Figure 2A:
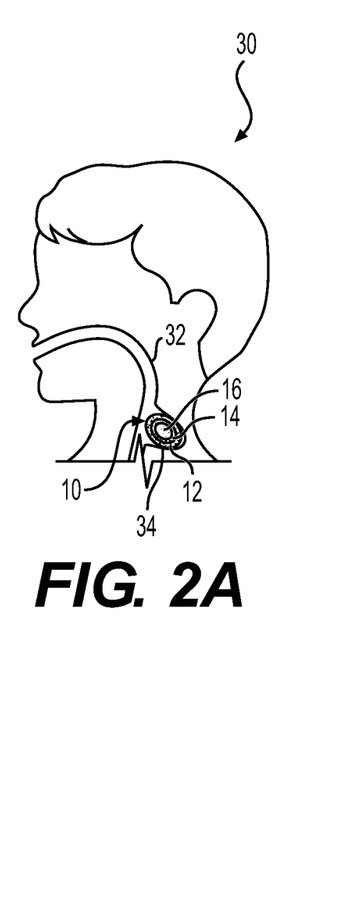
FIGS. 2A-2D illustrate views of the medical device of FIG. 1 in various stages of usage in a subject, according to aspects of the disclosure.

As shown in FIG. 2A, sponge 10 may be inserted into a wound or pocket 34 in esophagus 32. For example, a procedure on esophagus 32 may form pocket 34, and sponge 10 may be inserted as part of the recovery process. The endoscope may be, for example, a bronchoscope, colonoscope, hysteroscope, cystoscope, a tube, a sheath, or any similar insertion device. Sponge 10 may be inserted via an endoscope, for example, through an internal lumen of the endoscope that was being used to perform the procedure. Sponge 10 may be sized and/or shaped to fit within and/or correspond to pocket 34. In one aspect, sponge 10 may be sized, shaped, have a rigidity, etc. in order to help maintain a size and/or shape of pocket 34. As mentioned above, the thicknesses, shapes, and/or number of layers 12, 14, 16 of sponge 10 may vary. For example, in one aspect, outer layer 12 may be substantially ovular to fit within pocket 34, and intermediate layer 14 and inner layer 16 may also be substantially ovular, or alternatively, may be substantially circular.

Figure 2B:
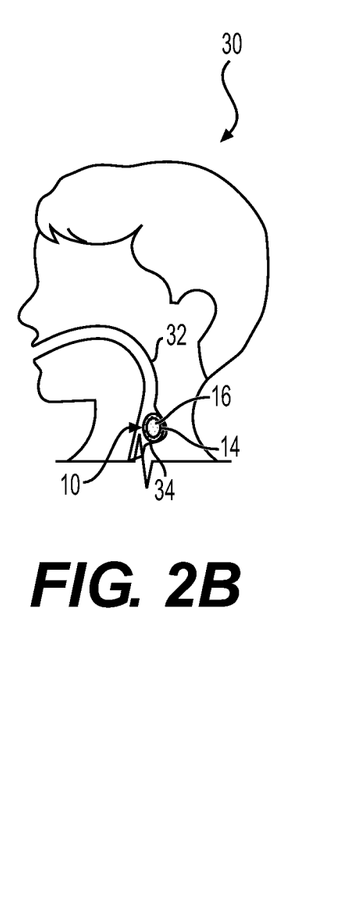

As shown in FIG. 2B, sponge 10 degrades over time. The degradation may be approximated to correspond to an estimated recovery time of the wound that forms pocket 34. For example, as the wound recovers and pocket 34 shrinks in size, one or more layers 12, 14, 16 (e.g., outer layer 12) degrades to reduce the size of sponge 10. In this aspect, the degradation (and shrinking) of sponge 10 allows for sponge 10 to shrink with the healing of the wound, and thus the shrinking of pocket 34. The sizes, shapes, thicknesses, materials, etc., of layers 12, 14, 16 of sponge 10 may selected to match the shrinking size and/or change of shape of pocket 34. In one aspect, outer layer 12 may have degraded in FIG. 2B, and pocket 34 may have reduced in size and/or changed shape.

Figure 2C:
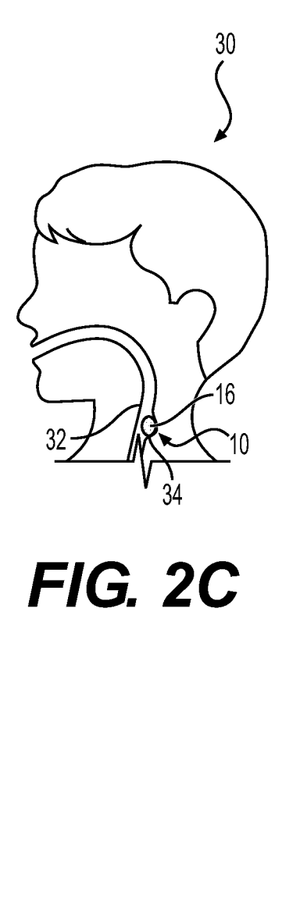

FIG. 2C illustrates further degradation of sponge 10 and the reduction of size of pocket 34 during the recovery. In this aspect, intermediate layer 14 may have degraded in FIG. 2C, and pocket 34 may have further reduced in size. Additionally, sponge 10 may be formed of a material that may help sponge 10 be retained within pocket 34 and/or grip esophagus 32 as pocket 34 reduces in size. For example, one or more layers 12, 14, 16 may include a bioadhesive (e.g., chitosan, which has properties that allows it to bind to negatively charged surfaces, such as mucosal membranes).

Figure 2D:
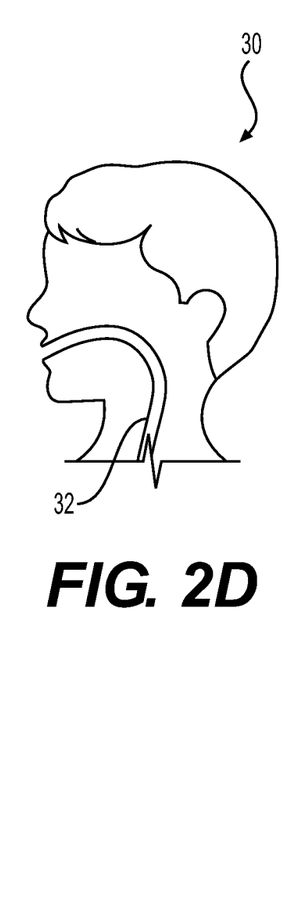

FIG. 2D illustrates a last stage of the healing process. For example, as shown, pocket 34 may have been further reduced, for example, eliminated. In this aspect, inner layer 16 may have degraded. Because at least some portions of sponge 10 are biocompatible and degrade, there may be no need for a physician to insert an endoscope to adjust, exchange, and/or remove sponge 10. Alternatively, as discussed above, inner layer 16 may not be fully degradable, and the physician may insert an endoscope and remove inner layer 16. Furthermore, in one aspect, the physician may insert a smaller sponge, which may help facilitate the healing if pocket 34 has not yet been eliminated or has not sufficiently shrunk.

FIGS. 3 and 4A-4D illustrate alternative examples according to the disclosure. FIGS. 3 and 4A-4D illustrate similar elements to sponge 10 and subject 30 shown by 100 added to the reference numbers.

Figure 3:
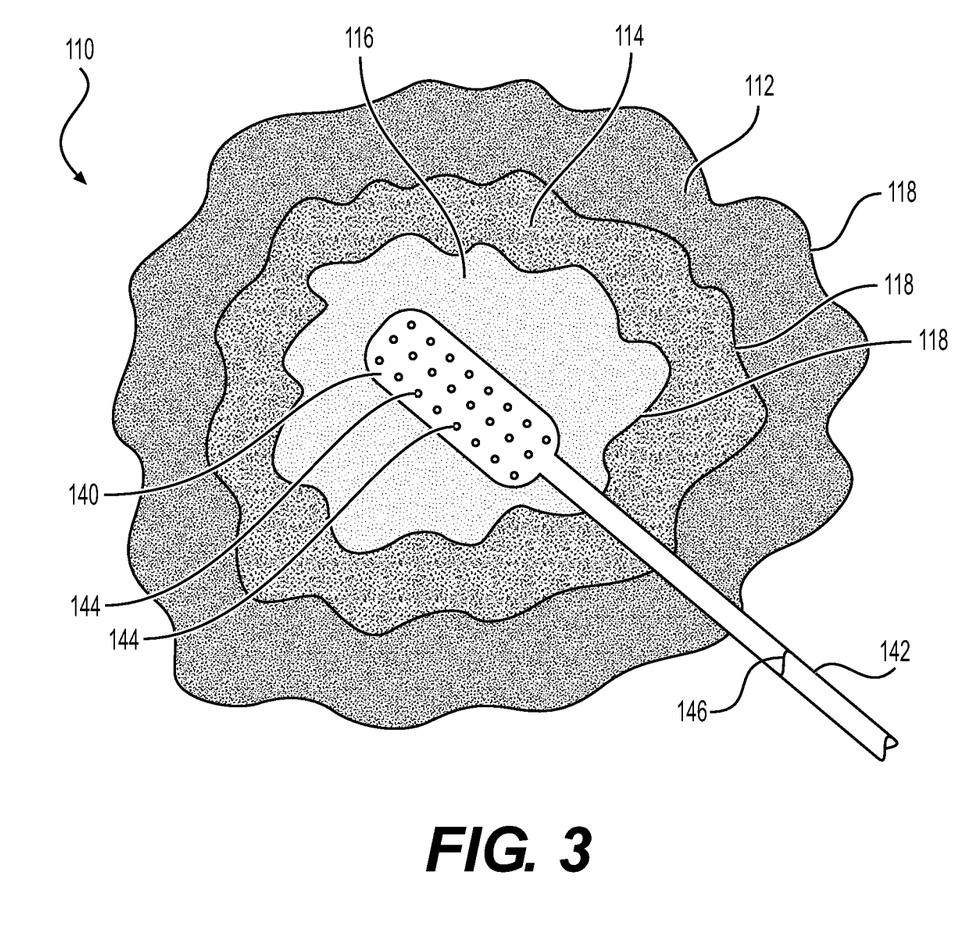
FIG. 3 illustrates a cross-sectional view of an alternative exemplary medical device, according to aspects of the disclosure.

As shown in FIG. 3, a sponge 110 includes a plurality of layers, for example, an outer layer 112, an intermediate layer 114, and an inner layer 116, which may degrade at different rates, a discussed above with respect to layers 12, 14, 16. Indeed, sponge 110 may include any of the features discussed with respect to sponge 10. Sponge 110 may include one or more antibacterial or antimicrobial layers 118, for example, on outer layer 112, between outer layer 112 and intermediate layer 114, and/or between intermediate layer 114 and inner layer 116. Additionally, sponge 110 includes an innermost layer, or an inner core 140, and a suction port 142. Inner core 140 may be formed of a non-degradable material within inner layer 116. Alternatively, inner core 140 may be formed of a degradable material within inner layer 116, and the degradable material of inner core 140 may degrade at a rate slower than inner layer 116 (and the other layers of sponge 110). In either aspect, inner core 140 may include one or more openings 144 fluidly coupled to suction port 142 such that fluid may enter inner core 140 through openings 144 and may be removed from the subject through suction port 142 when negative pressure is applied through suction port 142.

Figure 4A:
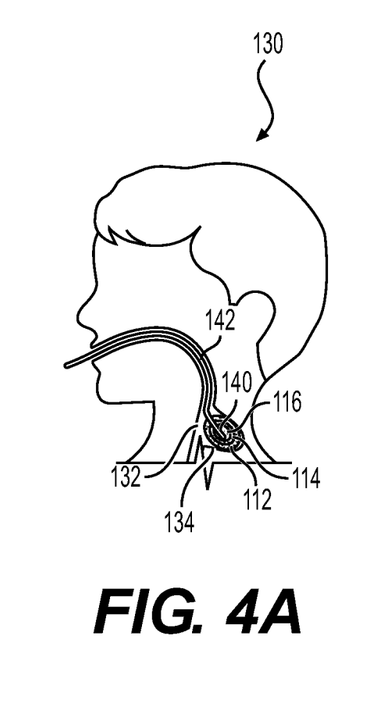
FIGS. 4A-4D illustrate views of the medical device of FIG. 3 in various stages of usage in a subject, according to aspects of the disclosure.
Figure 4B:
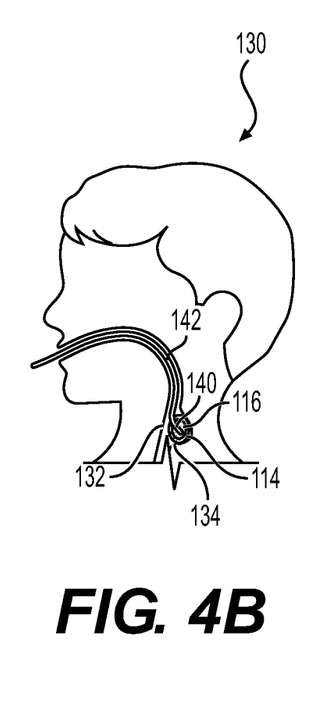
Figure 4C:
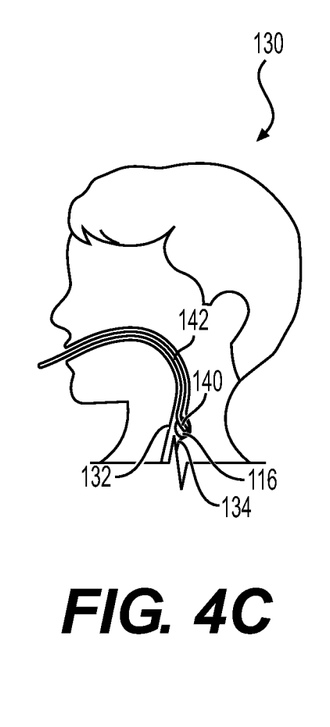

Suction port 142 may be a lumen formed of a biocompatible material, for example, a plastic (e.g., polyethylene), a metal (e.g., a stainless steel), a composite material, etc. As shown, suction port 142 is coupled to inner core 140. In one aspect, suction port 142 may extend to the exterior of subject 130, for example, out of an orifice (e.g., mouth), as shown in FIGS. 4A-4C. Accordingly, a suction source may be coupled to suction port 142, and negative pressure may be applied to sponge 110. In another aspect, suction port 142 may extend from sponge 110 but not exterior of subject 130. In this aspect, a suction tube may be inserted through an orifice (e.g., mouth) and coupled to suction port 142 to apply negative pressure to help remove excess fluid and/or degraded material from sponge 110. Applying negative pressure may help remove excess fluid and/or degraded material of one or more layers from sponge 110. Furthermore, applying negative pressure may help decrease the size of pocket 134 and/or may help the wound heal.

In some aspects, there may include a removable and/or releasable connector, for example, proximal to inner core 140. The connector may allow for a physician to attach, disconnect, and/or reattach a suction tube and/or suction port 142 to inner core 140. Alternatively or additionally, in some aspects, suction port 142 may include a frangible link or connection 146 positioned on a portion of suction port 142. For example, frangible link or connection 146 may be positioned on suction port 142 proximate to a portion of sponge 110, for example, outer layer 112. In these aspects, frangible link or connection 146 may maintain the connection between inner core 140 and suction port 142 for a period of time, for example, a time during which negative pressure/suction may be applied to sponge 110. Then, after another period of time, frangible link or connection 146 may disconnect at least a portion of suction port 142 from inner core 140. Suction port 142 may be removed from the subject, and inner core 140, for example, with one or more layers 112, 114, 116 of sponge 110, may remain in the subject. As discussed herein, inner core 140 and the one or more layers 112, 114, 116 of sponge 110 may be degradable.

In any of these aspects, FIGS. 4A-4D illustrate views of an internal lumen, for example, an esophagus 132, of subject 130 during various stages of recovery from a procedure (e.g., bariatric surgery). For example, FIGS. 4A-4D illustrate views of esophagus 132 with sponge 110 in various stages of recovery from the procedure that included the formation of a wound in a pocket 134.

As shown in FIG. 4A, sponge 110, with inner core 140 and suction port 142, may be inserted into pocket 134 in esophagus 132. For example, a procedure on esophagus 132 may form pocket 134, and sponge 110 may be inserted as part of the recovery process. Sponge 110 may be inserted via an endoscope, for example, through an internal lumen of the endoscope that was being used to perform the procedure. Sponge 110 may be sized and/or shaped to fit within and/or correspond to pocket 134. Additionally, negative pressure may be applied via suction port 142 to help remove fluid and/or degraded portions of sponge 110 over the course of the treatment.

As shown in FIG. 4B, portions of sponge 110 degrade over time. The degradation may be approximated to correspond to an estimated recovery time of the wound that forms pocket 134. For example, as the wound recovers and pocket 134 shrinks in size, one or more layers 112, 114, 116 (e.g., outer layer 112) degrades to reduce the size of sponge 110. In this aspect, the degradation (and shrinking) of sponge 110 allows for sponge 110 to shrink with the healing of the wound, and thus the shrinking of pocket 134. As discussed above, the sizes, shapes, thicknesses, materials, etc., of layers 112, 114, 116 of sponge 110 may selected to match the shrinking size and/or change of shape of pocket 134. In one aspect, outer layer 112 may have degraded in FIG. 4B, and pocket 134 may have reduced in size and/or changed shape. For example, one or more layers 112, 114, 116 may include a bioadhesive (e.g., chitosan, which has properties that allows it to bind to negatively charged surfaces, such as mucosal membranes).

FIG. 4C illustrates further degradation of sponge 110 and the reduction of size of pocket 134 during the recovery. In this aspect, intermediate layer 114 may have degraded in FIG. 4C, and pocket 134 may have further reduced in size. Additionally, sponge 110 may be formed of a material (e.g., a bioadhesive) that may help sponge 110 be retained within pocket 134 and/or grip esophagus 132.

Figure 4D:
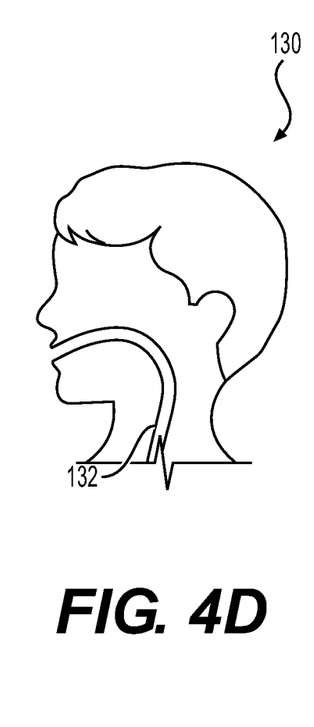

FIG. 4D illustrates a last stage of the healing process. For example, as shown, pocket 134 may have been further reduced, for example, eliminated. Inner layer 116 may have degraded. Then, inner core 140 and suction port 142 may be removed by the physician, for example, by proximally retracted suction port 142 or by inserting an endoscope and removing inner core 140 and suction port 142. In another aspect, inner core 140 may also have degraded, in embodiments where inner core 140 is biodegradable.

As discussed above, successive layers of sponge 110 may help pocket 134 close (and thus help wound heal). Additionally, applying suction to sponge 110 may help close pocket 134 (and thus help the wound heal). When pocket 134 is closed (or nearly closed), the physician may remove the remaining portion(s) of sponge 110, for example, inner core 140 and suction port 142.

In these examples, sponges 10, 110 may be sized (e.g., cut) to approximate and/or correspond to a size and/or shape of pockets 34, 134. In any of the aspects discussed herein, the sponge may be removed, and a new sponge may be delivered or formed. For example, if it takes approximately 30 days for a wound to fully heal, a sponge may be removed, and a new sponge may be delivered approximately five to seven times.

In another aspect, as discussed below, one or more layers of sponge 110 may be formed of a foam. In this aspect, for example, inner core 140 and suction port 142 may be positioned within pocket 134, and a foam may be delivered (e.g., sprayed) around inner core 140 and suction port 142. The foam may be pumped over and/or around inner core 140 and a portion of suction port 142 to form a foam sponge. For example, the foam could be pumped and/or delivered to pocket 134 via one or more of openings 144. In this aspect, suction tube 142 may include two or more separate lumens coupled to inner core. For example, although not shown, suction tube 142 may include a first lumen couplable to a negative pressure/suction source, and suction tube 142 may also include a second lumen couplable to a source of foam to deliver the foam to form the foam sponge. The foam may be a self-sizing material, for example, may expand to the size and/or shape of pocket 134. The foam sponge may be formed of and/or include chitosan (e.g., chitosan acetate and/or chitosan lactate), silver-based materials, and/or any medical-grade material, etc. The foam sponge may be formed of and/or include an antimicrobial material (e.g., a swellable antimicrobial material). The foam sponge may be at least partially of fully degradable. Alternatively, the foam sponge may be biostable and removed periodically, for example, every few days or weekly. The foam may be an open-cell foam, such that interconnecting channels allows for fluid or material flow through the foam when negative pressure is applied by a suction source.

Figure 5A:
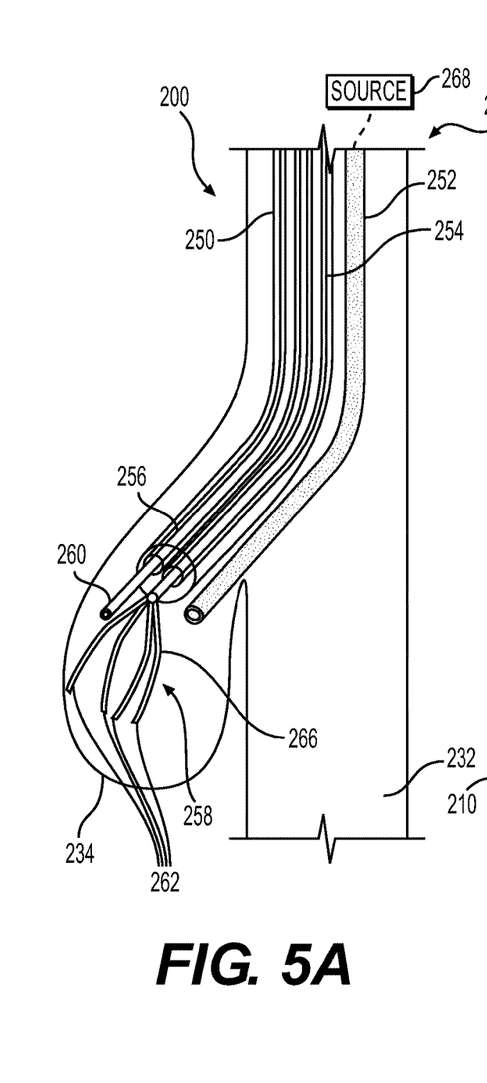
FIGS. 5A-5C illustrate an exemplary medical system in various stages of usage in a subject, according to aspects of the disclosure.
Figures 5B, 5C:
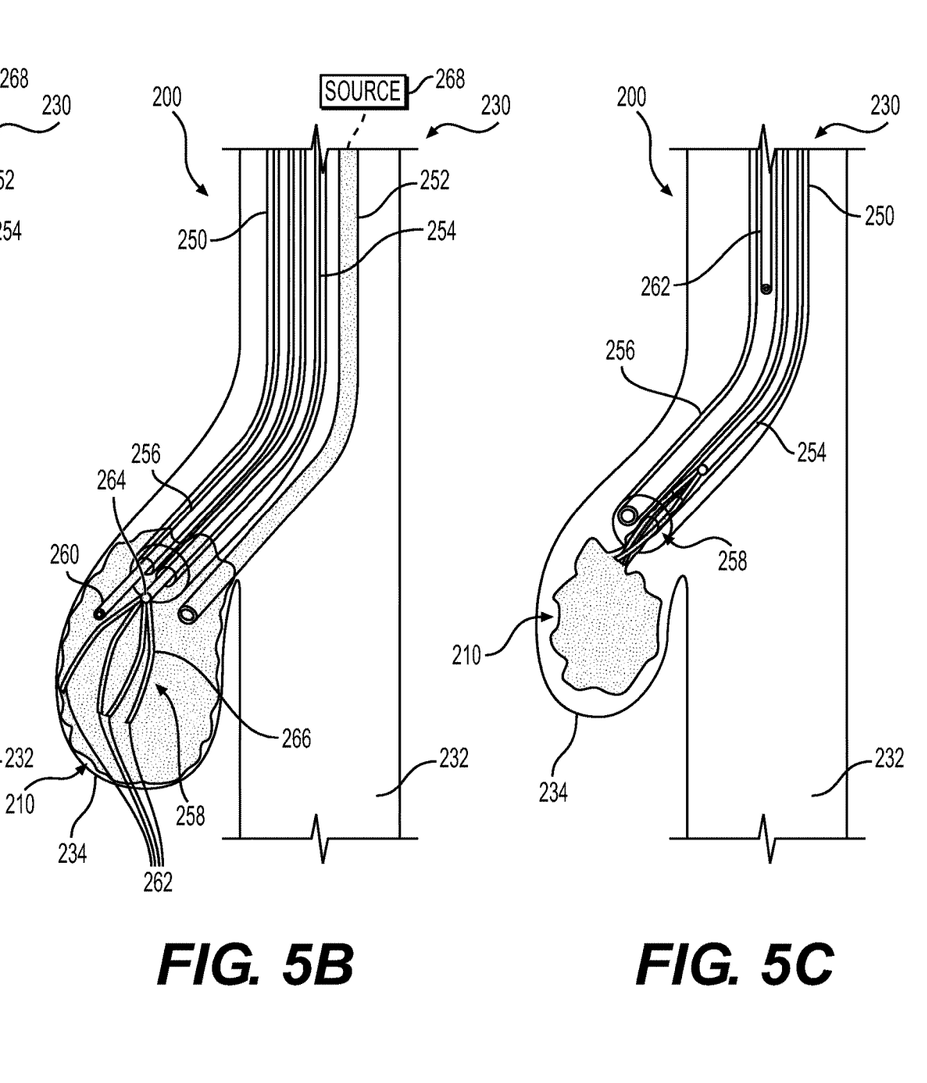

FIGS. 5A-5C illustrate another exemplary medical system 200, with similar elements to sponge 10 and subject 30 shown by 200 added to the reference numbers. FIGS. 5A-5C illustrate a sponge 210 in various stages of usage in a subject 230, for example, in an esophagus 232 and a wound or anastomosis, for example, a wound or pocket 234. In some aspects, system 200 may be packaged as a kit. As shown in FIG. 5A, system 200 includes an insertion device, such as, for example, a catheter 250, and a delivery tube 252. Catheter 250 may be a dual-lumen catheter, with a first lumen 254 and a second lumen 256. Catheter 250 may be delivered to a treatment site, for example, to pocket 234 via an orifice (e.g., a mouth or nose) and down esophagus 232. In this aspect, system 200 may include a medical device that may help support and/or remove sponge 210, for example, a cage 258, and a suction tube 260. It is noted that catheter 250 is shown as being transparent in order to aid in the clarity of the figures.

Cage 258 may be delivered through first lumen 254 of catheter 250, and may be movable relative to catheter 250 (e.g., extendable distally beyond a distal end of catheter 250). Cage 258 may include a plurality of self-expandable arms 262, for example, formed of a biocompatible and shape-memory metal (e.g., nitinol). Cage 258 may be formed of a material that has a bias toward the expanded configuration. For example, as shown in FIGS. 2A and 2B, cage 258 may include four arms 262. Alternatively, cage 258 may include two, three, five, or more arms 262. In this aspect, when cage 258 is extended from first lumen 254, arms 262 expand radially outward to form cage 258. Once catheter 250 is in position at the treatment site (e.g., pocket 234), cage 258 may be deployed or extended into a cavity (e.g., into pocket 234).

Suction tube 260 may be delivered through second lumen 256 of catheter 250, and may also be movable relative to catheter 250 (e.g., extendable distally beyond a distal end of catheter 250. Suction tube 260 may be a plastic tube, for example, a nasogastric tube, and may be coupled to a suction source (not shown) such that a distal end 264 of suction tube 260 may apply suction to pocket 234. When catheter 250 is in position, suction tube 260 may be advanced distally into pocket 234, for example, to a position within or adjacent to cage 258.

Delivery tube 252 may be a foam dispenser, which may deliver a foam that forms a sponge or other like porous and/or absorbent body, as shown in FIGS. 5B and 5C. Delivery tube 252 may be coupled to catheter 250, or may be separately delivered to pocket 234, for example, advanced along an exterior of catheter 250 (effectively using catheter 250 as a guidewire). Alternatively, delivery tube 252 could be advanced through first lumen 254 or second lumen 256, or through another lumen of catheter 250. As shown in FIG. 5B, a sponge material may be delivered to pocket 234 via delivery tube 252 to form sponge 210. A proximal end of delivery tube 252 may be coupled to a source 268 of sponge material, for example, which may be a pressurized source of the sponge material, such that the sponge material may be delivered through delivery tube 252 and, for example, sprayed (aerosolized) into pocket 234. Sponge 210 may be formed in pocket 234 so as to at least partially surround distal portions of catheter 250 and/or delivery tube 252, as shown in FIG. 5B. Alternatively, sponge 210 may be formed so as to be distal to one or more of catheter 250 and/or delivery tube 252, such that sponge 210 only surrounds portion(s) of cage 258 and suction tube 260.

The sponge material may be a sponge foam, for example, a liquid phase polyurethane (PU) foam, that expands and/or solidifies when in contact with moisture and/or air to form sponge 210 within pocket 234. The sponge material may be an injectable open cell foam, for example, that is used to treat an abdominal hemorrhage. In another aspect, the sponge material may be a two-liquid polyurethane (PU) foam. For example, delivery tube 252 may include two lumens, with proximal ends of each lumen coupled to different liquid polyurethane (PU) foam sources. When the two liquids are delivered into pocket 234 by delivery tube 252, the liquids may come into contact, and may solidify to form sponge 210. Sponge 210 may be formed by the two-liquid polyurethane (PU) foam coming into contact and solidifying. In these aspects, the nature of the foam (e.g., open cell) that forms the sponge material may allow fluid to drain through struts or openings of the foam (e.g., polyurethane struts) when vacuum pressure/suction is applied to sponge 210. Additionally, because sponge 210 is formed by the delivered sponge material, sponge 210 may expand to take the shape of pocket 234.

As shown in FIG. 5B, cage 258 and suction tube 260 may be extended into pocket 234 when the sponge material is delivered. In this aspect, at least distal portions of cage 258 (e.g., arms 262) and suction tube 260 (e.g., distal end 264) may be positioned within sponge 210. When the sponge material solidifies to form sponge 210, portions of both cage 258 and suction tube 260 may be secured within and to sponge 210 Additionally, in one example, distal end 264 of suction tube 260 may be positioned within cage 158 such that arms 262 at least partially surround distal end 264.

In these aspects, delivering the sponge material to pocket 234 allows for the sponge material to expand and take the shape of pocket 234, such that the physician does not need to guess the size and/or shape of pocket 234, and then deliver a sponge that corresponds to the size and/or shape. Additionally, with distal end 264 of suction tube 260 positioned within sponge 210, suction may be applied through suction tube 260, and fluid and/or degraded material from sponge 210 may be removed from pocket 234 through suction tube 260.

As shown in FIG. 5C, once pocket 234 has reduced in size, for example, as the wound or anastomosis has at least partially healed, sponge 210 may require removal and/or replacement. It is noted that suction tube 260 may be retracted proximally out of sponge 210 and to a position within catheter 250, as shown in FIG. 2C, before removal and/or replacement of sponge 210. Additionally, as shown in FIG. 2C, delivery tube 252 may have been removed from subject 230 before removable and/or replacement of sponge 210. For example, delivery tube 252 may be removed from subject 232 after the formation of sponge 210.

After delivery tube 252 is removed from sponge 210, cage 258 may be retracted proximally (e.g., through first lumen 254). Because arms 262 of cage 258 are secured within sponge, proximal movement of cage 258 may also retract sponge 210. The proximal movement may at least partially collapse arms 262, for example, as arms 262 enter first lumen 254. Additionally, arms 262 may each include a curve or bend 266, for example, in a middle portion of arms 262. Arms 262 may expand radially outward, and distal portions of arms 262 may bend radially inward. Accordingly, as cage 258 is retracted proximally, arms 262, with bends 266, may hook onto portions of sponge 210 and also retract sponge 210 proximally. As mentioned, sponge 210 may be formed of any appropriate material (e.g., a shape memory alloy), and is collapsible such that sponge 210 and cage 258 may be removed through first lumen 254. It is noted that first lumen 254 may be an appropriate size to deliver cage 258 and retract cage 258 and sponge 210. Cage 258, along with sponge 210, may be retract proximally and out of catheter 250, without removing or otherwise affecting the position of catheter 250.

Because sponge 210 may be removed without affecting the position of catheter 250, the above steps may be repeated in order to deliver and/or form a new sponge within pocket 234. For example, cage 258 may be re-inserted through first lumen 258, and suction tube 260 may be extended distally to a position within or adjacent to cage 258. Then, delivery tube 252 may be reinserted, and may again deliver sponge material to pocket 234 to form a new sponge, which may take the size and/or shape of pocket 234, which may be smaller and/or a different shape compared to its size and shape at the outset of the procedure, for example, because pocket 234 has reduced in size and/or changed shape. The above steps may be performed as many times as necessary until pocket 234 has closed, healed, or otherwise does not necessitate sponge 210.

Figure 6A:
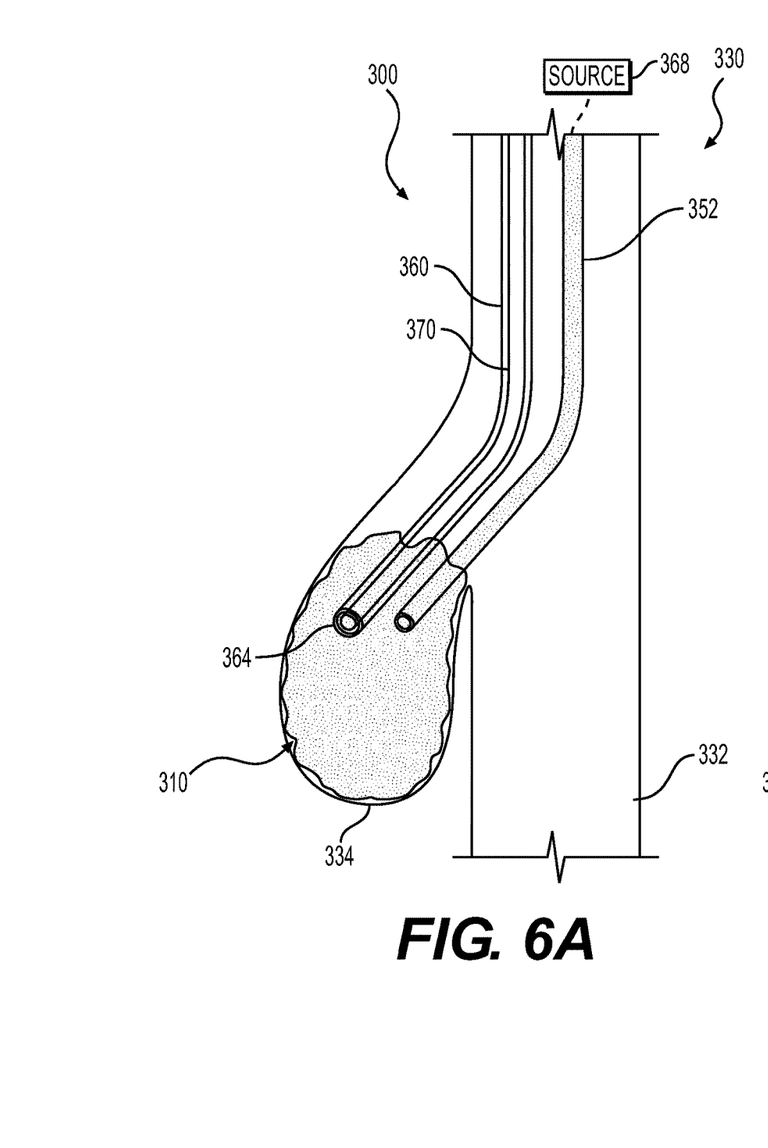
FIGS. 6A and 6B illustrate another exemplary medical system in various stages of usage in a subject, according to aspects of the disclosure.
Figure 6B:
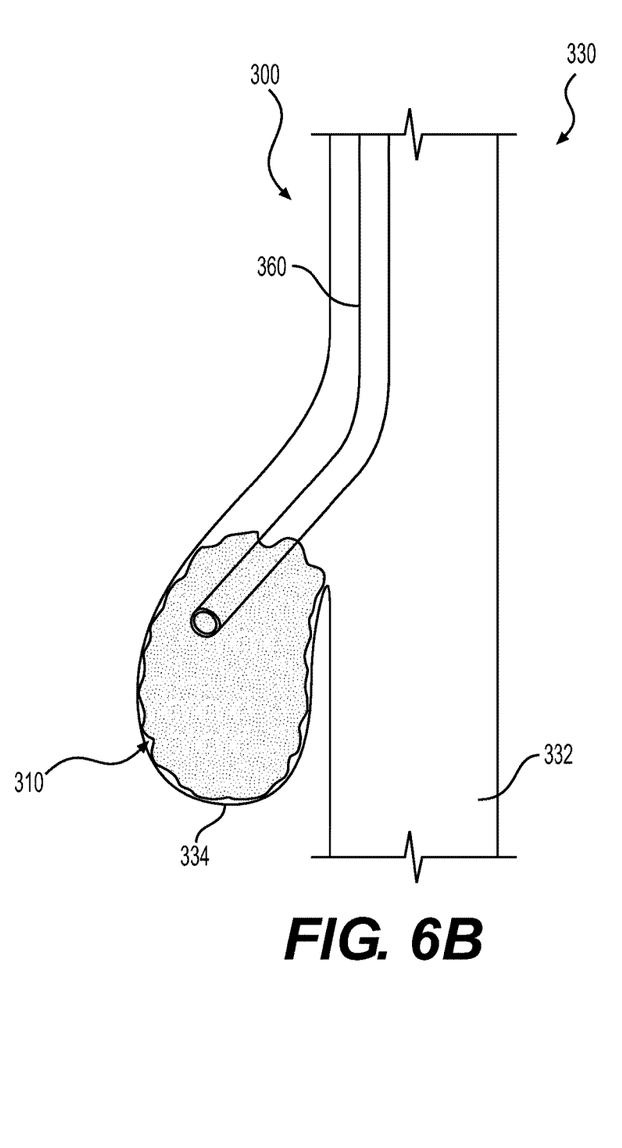

FIGS. 6A and 6B illustrate another exemplary medical system 300, with similar elements to sponge 10 and subject 30 shown by 300 added to the reference numbers. FIGS. 6A and 6B illustrate a sponge 310 and various stages of usage in a subject 330, for example, in an esophagus 332 and a wound or anastomosis, for example, a pocket 334. In some aspects, system 300 may be packaged as a kit. As shown in FIG. 6A, system 300 includes a delivery tube 352 and a suction tube 360. In some embodiments, system 300 does not include a separate endoscope or other insertion device. Nevertheless, suction tube 360 may help to support and/or remove at least a portion of sponge 310.

Suction tube 360 may be delivered to a treatment site, for example, to pocket 334 in any manner. In one aspect, suction tube 360 may include a rod 370 positioned within suction tube 360 during the delivery of suction tube 360. For example, suction tube 360 with rod 370 may be delivered to a treatment site, for example, to pocket 334 via an orifice (e.g., a mouth) and down esophagus 332. Alternatively or additionally, suction tube 360 with rod 370 may be delivered to pocket 334 via a guide wire. Moreover, in one aspect, suction tube 360 may be delivered to pocket 334, and then rod 370 may be inserted into suction tube 360.

Rod 370 may be at least partially rigid and/or may be formed of a shape-memory alloy. When positioned within suction tube 360, rod 370 may occupy all or a majority of the internal lumen of suction tube 360. For example, when rod 370 is positioned within suction tube 360, rod 370 may help to form a seal (or at least a partial seal) within suction tube 360.

Delivery tube 352 may be a foam dispenser, which may deliver a foam that forms a sponge 310 or other like porous and/or absorbent body, as shown in FIG. 6A. Delivery tube 352 may be coupled to suction tube 360, or may be separately delivered to pocket 358, for example, advanced along an exterior of suction tube 360, delivered via a guide wire, etc. As shown in FIG. 6A, a sponge material may be delivered to pocket 358 via delivery tube 352 to form sponge 310. As discussed above, a proximal end of delivery tube 352 may be coupled to a source 368 of sponge material, for example, which may be a pressurized source of the sponge material, such that the sponge material may be delivered through delivery tube 352 and, for example, sprayed (aerosolized) into pocket 334. The sponge material may be any of the materials discussed above with respect to FIGS. 5A-5C.

The sponge material may expand and solidify into a porous and/or absorbent body, for example, sponge 310. Sponge 310 may expand to take the shape of pocket 334 and may also surround a distal end 364 of suction tube 360. Distal end 364 of suction tube 360 may be at least partially secured within sponge 310. Nevertheless, as delivery tube 352 delivers the sponge material into pocket 334, rod 370 may help prevent the sponge material from flowing into suction tube 360, and thus help prevent the sponge material from forming a blockage in suction tube 360. Moreover, rod 370 may be manipulated, for example, extending distally to and/or out of distal end 364 of suction tube 260 to push sponge material out of suction tube 360 and/or away from distal end 364 of suction tube 360.

As shown in FIG. 6B, delivery tube 352 and rod 370 may be removed. Suction may then be applied to sponge 310 through suction tube 360. The suction may help to remove excess fluid from pocket 334. Additionally, as discussed above, sponge 310 may be biodegradable, and suction through suction tube 360 may help to remove material that has degraded over time.

If sponge 310 requires replacement (e.g., pocket 334 has changed size and/or shape, sponge 310 has degraded, etc.), sponge 310 may be at least partially removed, and additional sponge material may be delivered. For example, suction through suction tube 360 may help to remove degraded material from sponge 310. Alternatively or additionally, a separate tube, catheter, grasper, retrieval device, etc. may be delivered to pocket 334 to remove one or more portions of sponge 310, as discussed above with respect to catheter 250 and cage 258. Furthermore, in another aspect, for example, if sponge 310 is not biodegradable or has not yet degraded sufficiently, suction tube 360 may be retracted proximally out of subject 330, also removing sponge 310 coupled to suction tube 360. In this aspect, suction tube 360 (or a new suction tube 360) may be delivered to pocket 334 and appropriately positioned. After sponge 310 has been removed (and suction tube 360 has been positioned, if necessary), delivery tube 352 may be delivered to pocket 334 and deliver additional sponge material to form a new sponge 310, as discussed above. Furthermore, rod 370 may be delivered through suction tube 360 to help ensure that the new sponge 310 does not block distal end 364 of suction tube 360.

In one aspect, the non-degraded portions of sponge 310 may not require removal. In this aspect, the degraded portions of sponge 310 may be removed via suction through suction tube 360. Then, delivery tube 352 may be delivered to pocket 334 and deliver additional sponge material. The additional sponge material may replace the degraded portions of sponge 310. Furthermore, as mentioned above, rod 370 may be delivered through suction tube 360 to help ensure that the new sponge material does not block distal end 364 of suction tube 360.

The above steps may be performed as many times as necessary until pocket 334 has closed, healed, or otherwise does not necessitate sponge 310. Additionally, the above steps may be performed without removing or otherwise affecting the position of suction tube 360. The additional sponge material (either by forming a new sponge or by replacing the degraded sponge material) may form successive sponges 310, which may be smaller and/or different shapes, for example, because pocket 334 has reduced in size and/or changed shape.

Figure 7A:
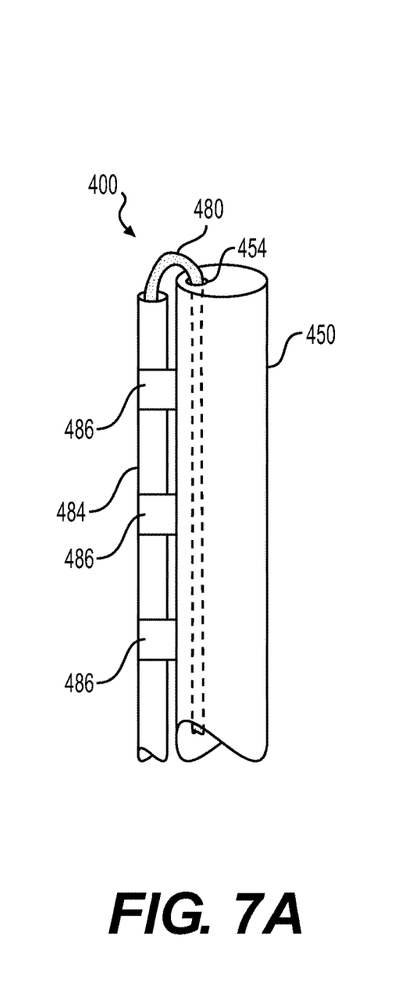
FIGS. 7A-7C illustrate yet another exemplary medical system in various stages of usage, according to aspects of the disclosure.
Figure 7B:
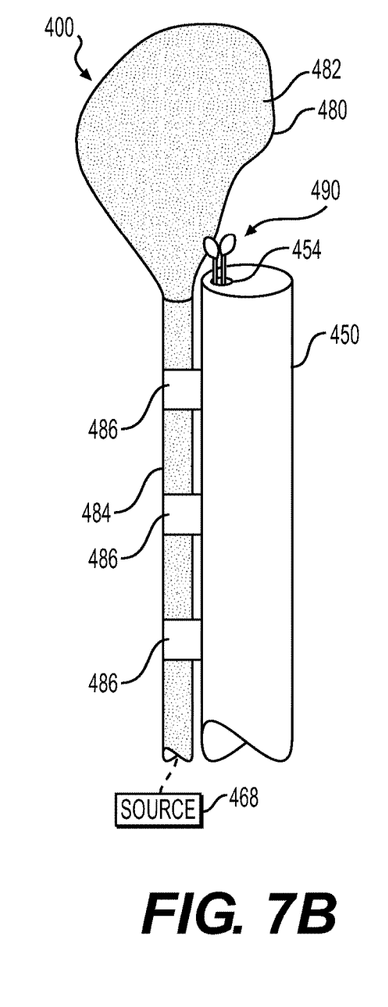
Figure 7C:
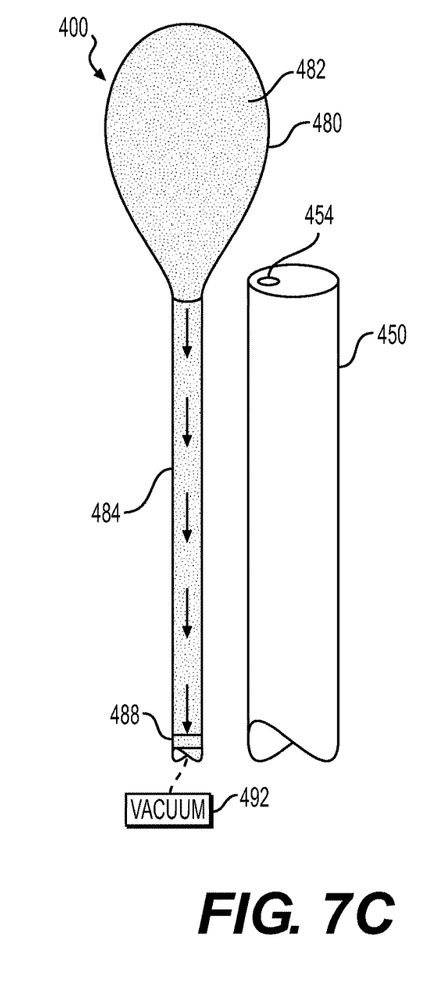

FIGS. 7A-7C illustrate yet another exemplary medical system 400, with similar elements to the aforementioned systems shown by 400 added to the reference numbers. FIGS. 7A-7C illustrate a porous bag 480 and a treatment material 482 in various stages of usage in a subject, for example, in an esophagus (or GI tract) and a wound, anastomosis, or pocket, as discussed above. In some aspects, system 400 may be packaged as a kit. As shown in FIG. 7A, system 400 also includes a tube 484 coupled to and/or supporting bag 480. Tube 484 and bag 480 may be delivered (e.g., to a treatment site) via an endoscope or catheter 450, for example, tube 484 may be coupled to catheter 450 via one or more coupling elements 486 (e.g., adhesives, hooks, clips, etc.). Moreover, at least a portion of bag 480 may be positioned within a lumen 454 of catheter 450 during the delivery and/or positioning of bag 480. Additionally, a portion of bag 480 extends exterior to catheter 450. For example, in some aspects, bag 480 is disposed through a distal portion of tube 484, and not through a proximal portion of tube 484.

As shown in FIG. 7B, bag 480 may be removed from lumen 454 of catheter 450 and extended, for example, into the wound, anastomosis, or pocket. In one aspect, a grasper 490 may be used to control, manipulate, and/or position bag 480. Additionally or alternatively, treatment material 482 may be delivered into bag 480, for example, via a source 468, to extend, expand, or otherwise position bag 480. For example, treatment material 482 may be delivered into bag 480 via tube 484. Treatment material 482 may help extend bag 480 (e.g., remove a portion of bag 480 from lumen 454), and bag 480 may expand (from a collapsed or compressed configuration to an expanded configuration) to take the size and/or shape of the wound, anastomosis, or pocket.

The bag 480 may be formed of a porous material, and the pores of bag 480 may be large enough for bag 480 to be porous to fluids (e.g., blood, pus, saline, etc.) that may be excreted by the wound, anastomosis, or pocket, or fluids that may be delivered to the wound or treatment site. Likewise, the pores of bag 480 may be small enough to retain treatment material 482 within bag 480 (i.e., the diameter of particles of treatment material 482 is greater than the diameter of the pores of bag 480). Bag 480 may compress treatment material 482 and may provide a semi-rigid surface (e.g., that may abut tissue within a wound, as discussed above), while also allowing for a vacuum to be applied through tube 484 and remove fluid and/or treatment material 482 from bag 480. In one aspect, bag 480 may be formed of a fine mesh, a nylon, or other appropriate material.

Treatment material 482 may be a material that is sponge-like and/or a similar material as the sponges discussed herein. For example, treatment material 482 may include one or more of a salt, a sugar, an antimicrobial material, etc. Treatment material 482 may include of any suitable bio-compatible material that may absorb liquids and/or permit liquid to pass therethrough via negative pressure/suction. Treatment material 482 may be flexible, compressible, porous, hydrophilic, sterile, and/or disposable. Treatment material 482 may be (or formed by) an open-cell foam. Suitable materials include collagens, polyurethanes, esters, ethers, composite materials, polyethylene glycols, polyethylene oxides, polysaccharides, silver-based materials, and/or any medical-grade material. In some aspects, treatment material 482 may include a biomaterial (e.g., materials that are biocompatible and/or derived from biological materials), which may be at least partially or completely bioresorbable, such as chitosan (e.g., chitosan acetate and/or chitosan lactate), extracellular matrix, or a combination thereof.

As shown in FIG. 7C, bag 480 and tube 484 may be disconnected from catheter 450. For example, catheter 450 may be removed from the subject, and bag 480 and tube 484 may remain in the subject. For example, bag 480 may be positioned within a wound, anastomosis, or pocket. Treatment material 482 may be delivered to bag 480, for example, through tube 484. Treatment material 482 may expand bag 480, for example, to a size and/or shape corresponding to the wound, anastomosis, or pocket. Bag 480 and treatment material 482 may help to absorb fluid, as discussed above with respect to the sponges, which may help the healing of the wound, anastomosis, or pocket.

In some aspects, negative pressure/suction may be applied to bag 480 and treatment material 482 through tube 484, for example, via a vacuum 492 coupled to tube 484, in order to remove fluid from the wound, anastomosis, or pocket. Moreover, as the wound, anastomosis, or pocket heals and/or shrinks suction may be applied to bag 480 and treatment material 482 through tube 484 in order to reduce the size and/or change the shape of bag 480, for example, by removing fluid and/or treatment material 482 from bag 480. In this aspect, bag 480 may change size and/or shape as the wound, anastomosis, or pocket heals or otherwise changes size and/or shape. Additionally or alternatively, additional treatment material 482 may be delivered to bag 480 through tube 484 (e.g., from source 468) to change the size and/or shape of bag 480. Furthermore, in some aspects, suction may be applied to bag 480 (e.g., via vacuum 492) to remove all or a majority of treatment material 482. In these aspects, additional treatment material 482 may be delivered to bag 480 through tube 484 (e.g., from source 468) to refill bag 480, which may take the size and/or shape of the wound, anastomosis, or pocket. These steps may be repeated as many times a needed to help the wound, anastomosis, or pocket heal and/or shrink. Moreover, bag 480 may be emptied and refilled without removing and/or repositioning bag 480 or tube 484.

As shown in FIG. 7C, tube 484 may include a regulation device 488, for example, at a proximal portion of tube 484. In some aspects, regulation device 488 may be a filter. The filter may be selectively positioned within a portion of tube 484, for example, after treatment material 482 has been delivered to bag 480. In this aspect, the filter may help for negative pressure/suction (e.g., from vacuum 492) to remove fluid from bag 480 or tube 484, without removing treatment material 482 from bag 480 or tube 484. The filter may be removable and/or may be selectively positioned in a non-filtering configuration, for example, when re-delivering treatment material 482 through tube 484 and bag 480. In another aspect, regulation device 488 may be a valve. The valve may be poisoned within or around a portion of tube 484. The valve may allow for treatment material 482 to be delivered through the valve and into tube 484 and bag 480. The valve may also help to retain treatment material 482 within tube 484 and bag 480. For example, in some aspects, with a first level of pressure applied (e.g., either positive pressure or negative pressure/suction), the valve allows for fluid, but not treatment material 482, to pass through the valve. Additionally, in some aspects, with a second level of pressure greater than the first level of pressure applied (e.g., either positive pressure or negative pressure/suction), the valve allows for fluid and treatment material 482 to pass through the valve.

In one aspect, tube 484 may be used to control and/or manipulate a position and/or orientation of bag 480. For example, tube 484 may be used to control (e.g., position, rotate, twist, etc.) bag 480, deliver material and/or fluid to bag 480, and/or apply suction to remove material and/or fluid from bag 480. Moreover, in some aspects, fluid may be delivered distally into bag 480 (e.g., via tube 484), which may help disconnect bag 480 from the wound, anastomosis, or pocket in a situation in which the wound, anastomosis, or pocket may engage with bag 480. In some aspects, the delivered fluid may be at least partially pressurized. Additionally or alternatively, tube 484 may be twisted in order to disengage bag 480 from the wound, anastomosis, or pocket.

These steps may be repeated as many times a needed to help the wound, anastomosis, or pocket heal and/or shrink. Moreover, bag 480 may be emptied and refilled without removing and/or repositioning bag 480 or tube 484.

Various aspects discussed herein may help to improve the efficacy of treatment and/or recovery from a procedure, for example, a bariatric surgery. Various aspects discussed herein may help to reduce and/or minimize recovery time, reduce and/or minimize patient discomfort, reduce and/or minimize physician interventions, reduce and/or minimize a need and/or reliance on imaging or visualization to position the sponge, etc. For example, various aspects discussed herein allow for a porous and/or absorbent body, for example, a sponge, or treatment material to be delivered to a treatment site, for the sponge or treatment material to be removed (either degrade, physically removed, or a combination thereof), and for another sponge or additional treatment material to be delivered to the treatment site without redelivering or repositioning various insertion devices. Additionally, various aspects discussed herein may be packaged as a kit to be used to treat a subject.

In some aspects, the sponges discussed herein may be biocompatible and degradable. Additionally, different layers or portions of the sponges may degrade at different rates. For example, different layers or portions of the sponges may be formed of different thicknesses, different materials, different densities, different blends of materials, etc. In this manner, the sponges may change size and/or shape over time, and the change in size and/or shape may correspond to changes in size and/or shape in the wound, anastomosis, pocket, etc. Accordingly, there may be a reduced need for a physician to remove and/or replace the sponge. Additionally, the sponges may include one or more antimicrobial layers and/or materials, which may help reduce risks of infection and/or help promote healing and reduction of size of the wound, anastomosis, pocket, etc.

Moreover, the sponge (e.g., formed by spray foam) or the treatment material (in bag 480) may take shape of the wound, anastomosis, or pocket. In this aspect, there may be a reduced and/or minimized need and/or reliance on imaging or visualization to size, position the sponge, etc. For example, the physician may not need to cut or otherwise form a sponge to the size and/or shape of the wound, anastomosis, or pocket. The entirety of the treatment material does not need to be delivered or removed through an orifice of the subject at one time. Additionally, in some aspects of this disclosure, the sponge or treatment material may take the size and/or shape of the wound, anastomosis, or pocket, even as the wound, anastomosis, or pocket changes in size and/or shape during the healing process.

Although the aspects of the medical systems discussed above as being used to treat a treatment site in an esophagus, stomach, duodenum, large intestine (colon), or small intestine, these aspects and methods may be used to treat any portion of a subject, and may help to reduce the overall recovery time, component costs, reduce the risks to the subject, etc.

While principles of the present disclosure are described herein with reference to illustrative aspects for various applications, it should be understood that the disclosure is not limited thereto. Those having ordinary skill in the art and access to the teachings provided herein will recognize additional modifications, applications, aspects, and substitution of equivalents all fall within the scope of the aspects described herein. Accordingly, the disclosure is not to be considered as limited by the foregoing description.

We claim:

1. A medical system comprising:
    a source of a material, wherein the material is configured to expand and form a porous body after the material is deployed into a body lumen;
    a first tube configured to deliver the material into the body lumen;
    a second tube configured to apply suction to the porous body; and
    a removal device including a plurality of arms configured to remove the porous body from the body lumen, wherein the removal device is configured to be deployed into the body lumen before the material is deployed into the body lumen, and wherein an entirety of each of the plurality of arms of the removal device is positioned within the porous body;
    wherein the first tube is coupled to the source of the material, and is configured to spray the material into the body lumen.

2. The medical system of claim 1, wherein the material includes a liquid phase polyurethane foam that expands and solidifies when in contact with moisture or air.

3. The medical system of claim 2, wherein the liquid phase polyurethane foam includes an open cell foam.

4. The medical system of claim 2, wherein the first tube includes at least two lumens, and wherein the liquid phase polyurethane foam includes two liquids, delivered separately through each of the at least two lumens, that solidify and form the porous body when the two liquids come into contact with one another.

5. The medical system of claim 4, wherein the material expands to take a shape of a pocket into which the material is delivered.

6. The medical system of claim 1, wherein the plurality of arms of the removal device are self-expandable and are formed of a shape memory alloy, and wherein a proximal-most end of each of the plurality of arms is configured to be exposed to the body lumen before the material is deployed into the body lumen.

7. The medical system of claim 6, wherein the removal device and the porous body are movable within a first lumen of an insertion device, and wherein proximal movement of the removal device and the porous body within the first lumen of the insertion device at least partially collapses the plurality of arms and the porous body.

8. The medical system of claim 7, wherein the second tube is configured to be retracted proximally out of the porous body and into a second lumen of the insertion device before the removal device and the porous body are retracted into the first lumen of the insertion device.

9. The medical system of claim 1, wherein the porous body is at least partially biodegradable.

10. The medical system of claim 1, wherein a middle portion of at least one of the plurality of arms, proximal of a distal portion of the at least one of the plurality of arms, includes a bend such that the at least one of the plurality of arms expands radially outward and the distal portion of the at least one of the plurality of arms bends radially inward.

11. The medical system of claim 1, wherein the porous body is configured to surround at least distal portions of the first tube and the second tube after the material is deployed into the body lumen.

12. A medical system comprising:
    an insertion device;
    a source of a material, wherein the material is configured to expand and form a porous body after the material is deployed into a body lumen;

a first tube extending along an exterior of the insertion device, wherein the first tube is configured to deliver the material into the body lumen;

a second tube movable within the insertion device, wherein the second tube is configured to apply suction to the porous body; and a removal device movable within the insertion device, wherein the removal device includes a plurality of arms that expand to form a cage, wherein the cage is configured to remove the porous body from the body lumen, and wherein an entirety of each of the plurality of arms is positioned within the porous body.

13. The medical system of claim 12, wherein the cage is configured to be positioned within the body lumen before the material is deployed into the body lumen, wherein the second tube is configured to be positioned within the cage, and wherein the second tube is configured to be retracted proximally out of the porous body and into the insertion device before removal of the porous body and the cage from the body lumen.

14. The medical system of claim 12, wherein the plurality of arms independently expand radially outward away from each other such that the cage is open at its distal end, and wherein a middle portion of each of the plurality of arms, proximal of a distal portion of the corresponding arm, includes a bend.

15. The medical system of claim 12, wherein the porous body is configured to surround at least distal portions of the insertion device, the first tube, and the second tube after the material is deployed into the body lumen.

16. A medical system comprising:

a material;

a source of the material, wherein the material is configured to expand and form a porous body after the material is deployed into a body lumen;

a first tube configured to deliver the material into the body lumen, wherein a proximal end of the first tube is coupled to the source of the material;

a second tube configured to apply suction to the porous body separate from the first tube, wherein the second tube is configured to be retracted proximally out of the porous body; and a removal device including a plurality of movable arms, wherein the removal device is configured to remove the porous body from the body lumen separate from the first tube, wherein the removal device is configured to be positioned within the body lumen before the material is deployed into the body lumen, and wherein an entirety of each of the plurality of movable arms is configured to be positioned within the porous body after the material is deployed into the body lumen.

17. The medical system of claim 16, wherein the plurality of movable arms are configured to hook onto portions of the porous body, and wherein each of the plurality of movable arms are retractable through a same distal opening of an insertion device.

18. The medical system of claim 16, wherein the porous body surrounds at least distal portions of the first tube and the second tube.

19. The medical system of claim 16, wherein the removal device includes five movable arms.

* * * * *